United States Patent
Jones

(10) Patent No.: US 11,315,563 B2
(45) Date of Patent: Apr. 26, 2022

(54) CONTENT PLAYBACK SYSTEM

(71) Applicant: B & W Group Ltd, Worthing (GB)

(72) Inventor: Andrew Hedley Jones, Bristol (GB)

(73) Assignee: B & W GROUP LTD, Worthing (GB)

( * ) Notice: Subject to any disclaimer, the term of this patent is extended or adjusted under 35 U.S.C. 154(b) by 117 days.

(21) Appl. No.: 16/694,344

(22) Filed: Nov. 25, 2019

(65) Prior Publication Data
US 2020/0175986 A1 Jun. 4, 2020

(30) Foreign Application Priority Data
Dec. 3, 2018 (GB) .................................. 1819658

(51) Int. Cl.
*G10L 15/22* (2006.01)
*G06F 40/295* (2020.01)
*G06F 3/16* (2006.01)
*G10L 15/18* (2013.01)
*G10L 15/08* (2006.01)

(52) U.S. Cl.
CPC .............. *G10L 15/22* (2013.01); *G06F 3/165* (2013.01); *G06F 40/295* (2020.01); *G10L 15/1815* (2013.01); *G10L 2015/088* (2013.01)

(58) Field of Classification Search
CPC .................. G10L 15/22; G10L 15/1815; G10L 2015/088; G06F 40/295; G06F 3/165
See application file for complete search history.

(56) References Cited

U.S. PATENT DOCUMENTS

| | | | |
|---|---|---|---|
| 8,620,667 B2 * | 12/2013 | Andrew | G10L 15/19 704/275 |
| 9,015,049 B2 * | 4/2015 | Baldwin | G10L 17/22 704/275 |
| 9,484,021 B1 * | 11/2016 | Mairesse | G10L 15/02 |
| 9,558,740 B1 * | 1/2017 | Mairesse | G10L 15/08 |
| 9,600,231 B1 * | 3/2017 | Sun | G10L 15/02 |
| 9,668,024 B2 * | 5/2017 | Os | G06F 16/73 |
| 9,721,570 B1 | 8/2017 | Beal et al. | |
| 9,966,065 B2 * | 5/2018 | Gruber | G06F 40/205 |
| 9,972,318 B1 | 5/2018 | Kelly et al. | |
| 10,068,573 B1 | 9/2018 | Aykac et al. | |
| 10,089,981 B1 * | 10/2018 | Elangovan | H04M 1/271 |

(Continued)

FOREIGN PATENT DOCUMENTS

| CA | 2694327 A1 * | 2/2009 | ........... G06F 40/263 |
|---|---|---|---|
| CN | 108228064 | 6/2018 | |

(Continued)

*Primary Examiner* — Mohammad K Islam
(74) *Attorney, Agent, or Firm* — Leason Ellis LLP

(57) ABSTRACT

The invention provides a content playback system comprising a playback device that is configured to detect a voice command from a user and to play content. When a voice command is received, the system is configured to analyse the voice command to determine a user intent. The system then extracts one or more entities from the voice command, wherein each of the extracted entities is of a type associated with the determined user intent. Then, based on the one or more extracted entities, the system controls the playback device. Analysis of the voice command in this manner may improve an accuracy with which a meaning of the voice command can be obtained, thereby facilitating control of the playback device.

19 Claims, 3 Drawing Sheets

(56) References Cited

U.S. PATENT DOCUMENTS

| | | | |
|---|---|---|---|
| 10,127,908 B1 | 11/2018 | Deller et al. | |
| 10,515,623 B1* | 12/2019 | Grizzel | G10L 15/01 |
| 10,672,379 B1* | 6/2020 | Eilert | G10L 15/22 |
| 10,692,485 B1* | 6/2020 | Grizzel | G10L 15/24 |
| 10,692,489 B1* | 6/2020 | Grizzel | G10L 15/18 |
| 10,706,843 B1* | 7/2020 | Elangovan | G10L 15/22 |
| 10,783,876 B1* | 9/2020 | Hoover | G10L 15/1815 |
| 11,016,968 B1* | 5/2021 | Hoover | G10L 15/22 |
| 2012/0030228 A1 | 2/2012 | Naidu et al. | |
| 2016/0163311 A1* | 6/2016 | Crook | G10L 15/065 |
| | | | 704/275 |
| 2016/0351190 A1* | 12/2016 | Piernot | G10L 15/22 |
| 2017/0243576 A1 | 8/2017 | Millington et al. | |
| 2017/0278514 A1 | 9/2017 | Mathias et al. | |
| 2018/0054504 A1 | 2/2018 | Hart et al. | |
| 2018/0166072 A1* | 6/2018 | Seksenov | G06F 16/9558 |
| 2018/0197543 A1* | 7/2018 | Gruenstein | G10L 15/32 |
| 2018/0286391 A1* | 10/2018 | Carey | G10L 15/22 |
| 2018/0336275 A1 | 11/2018 | Graham et al. | |
| 2018/0358000 A1* | 12/2018 | Amid | G06N 5/04 |
| 2018/0373494 A1* | 12/2018 | Loughrey | G06F 16/90335 |
| 2019/0180742 A1* | 6/2019 | Kothari | G10L 15/1822 |
| 2019/0180757 A1* | 6/2019 | Kothari | H04W 4/021 |
| 2019/0295544 A1* | 9/2019 | Garcia | G06F 40/30 |
| 2020/0301661 A1* | 9/2020 | Pasko | G10L 15/32 |
| 2021/0035552 A1* | 2/2021 | Grizzel | G10L 15/187 |
| 2021/0050008 A1* | 2/2021 | Ward | G10L 15/22 |
| 2021/0132926 A1* | 5/2021 | Wangikar | G06F 8/60 |

FOREIGN PATENT DOCUMENTS

| | | | | |
|---|---|---|---|---|
| EP | 2757510 | | 7/2014 | |
| JP | 2018045460 A | * | 3/2018 | G06F 40/174 |

* cited by examiner

CONTENT PLAYBACK SYSTEM

FIELD OF THE INVENTION

The present invention relates to a system for playing content via a voice-controlled playback device. The playback device is capable of playing content (e.g. audio content), and detecting a voice command from a user. The system enables a voice command detected by the playback device to be interpreted, to enable control of the playback device.

BACKGROUND

Voice-controlled speakers (sometimes referred to as "smart speakers") enable users to speak voice commands to interact with the speaker, as opposed to inputting commands manually (e.g. via buttons). A voice-controlled speaker typically includes a microphone for detecting and recording voice commands from the user, and a speaker for playing audio content. An on-board controller in the voice-controlled speaker may be configured to interpret detected voice commands (e.g. using speech recognition software), and to control the speaker accordingly, e.g. to play content requested by the user. The on-board controller may also control the speaker to communicate with the user, e.g. to ask the user a question or to provide information to the user. The content played by the speaker may for example be stored locally (e.g. in a memory of the speaker), or it may be stored remotely (e.g. on a remote content server) and transmitted to the speaker.

For some voice-controlled speakers, interpretation of the voice commands is performed remotely rather than by an on-board controller. For example, voice command interpretation may be performed through an online service. In such a case, the voice-controlled speaker may be connected to the internet, and configured to transmit the detected voice commands to a remote server where interpretation of the voice command is carried out. The remote server may then transmit instructions to the voice-controlled speaker in order to control the voice-controlled speaker in accordance with the user's voice command.

SUMMARY OF THE INVENTION

At its most general, the present invention provides a voice-controlled content playback system having a playback device (e.g. speaker), which enables a meaning to be extracted from a user-spoken voice command detected by the playback device, to facilitate control of the system via voice commands. This is achieved by first analysing the voice command to determine a user intent. The user intent is then used to extract one or more entities from the voice command to enable interpretation of the voice command. The playback device may then be controlled (e.g. to play content requested by the user) based on the entities extracted from the voice command. This multi-step analysis of the voice command may improve the accuracy with which a meaning of the voice command can be obtained. As a result, the overall ease of use of the content playback system may be improved, as a user is more likely to obtain a desired outcome when issuing a voice command.

Additionally, the playback system of the invention may serve to reduce the amount of processing that is required to interpret a voice command, thereby increasing the speed with which a voice command can be interpreted. This is because, by first determining the user intent, the system may preferentially search the voice command for entities that are of a type that is associated with the determined user intent. As a result, the system may be able to rapidly extract an entity from the voice command based on the determined user intent. This may provide a more responsive playback system. It may also be possible to implement the system of the invention using machine learning techniques to create, e.g. a neural network.

According to a first aspect of the invention there is provided a content playback system comprising: a playback device, the playback device being configured to detect a voice command from a user and to play content; wherein the system is configured to: analyse a voice command detected by the playback device to determine a user intent; analyse the voice command to extract one or more entities from the voice command, wherein each of the extracted entities is of a type associated with the determined user intent; and based on the one or more extracted entities, control the playback device.

Herein the term "content" refers to any type of playable content, e.g. audio content (e.g. songs, audio recordings, etc.) or video content (e.g. video clips, films, etc.). Any suitable media file format for the content may be used. The term "playback device" means any device capable of playing back such content. The playback device may include a playback mechanism for playing content. For example, the playback device may include a speaker for playing audio content, and/or a screen for displaying visual content. Examples of suitable playback devices include speakers, screens, televisions, mobile phones and computers. The playback device is configured to detect a voice command from a user. For example, the playback device may include a microphone for detecting voice commands from a user. The playback device may be configured to detect a voice command when its microphone detects a sound above a predetermined threshold. Alternatively, the playback device may be configured to detect a voice command when it detects a "wake word" (e.g. the user may say the wake work at the beginning of the voice command).

The user intent may correspond to a request type, e.g. it may correspond to a type of action that the user wants the content playback system to perform as a result of the voice command. For example, a user intent may be "play content", "generate new playlist", "change audio volume", "control playback", "request information" (e.g. where the user wishes to obtain information from the playback device), or "indicate preference" (e.g. where the user wishes to update a user preference). Many different types of user intent are also possible. The different possible types of user intent may depend on properties of the playback device or the system.

When the playback device detects a voice command from a user (e.g. via its microphone), the system may analyse the voice command to determine the user intent. In some examples, the system may be configured to store a recording of the voice command in a memory, so that the voice command may be analysed. Analysing the voice command may include converting the voice command to a text format, e.g. the voice command may be converted to a string of text (characters). This may be accomplished using conventional speech recognition software and techniques for converting speech (voice commands) to text.

The user intent may be determined based on the verbal content of the voice command, e.g. based on words present in the voice command. In some cases, the user intent may be determined by identifying the presence of a keyword in the voice command. For example, if the voice command includes the keyword "play", the system may determine that the user intent is to "play content", i.e. that the user wishes to play content via the playback device. As another example, if the voice command includes the keyword "volume", the system may determine that the user intent is to "change audio volume", i.e. that the user wishes to change the volume of the playback device.

Once the user intent has been determined, the system analyses the voice command to extract one or more entities from the voice command. Each of the extracted entities is of a type associated with the determined user intent. There may be multiple different types of entity associated with a particular user intent, such that the one or more extracted entities may include entities of different types. Thus, the system may only extract entities that are of a type associated with the user intent. For example, where the user intent is determined to be "play content", entity types associated with that user intent may include artist names, song names, genre names, etc. Many other entity types are also possible.

The entity being of a type associated with the determined user intent may mean that the entity is a type of entity that is appropriate for the determined user intent, or a type of entity that an action represented by the user intent can be (correctly) applied to, or a type of entity that relates to, or is associated with, an action represented by the user intent.

The system may extract entities from the voice command by searching the voice command (or a string of text corresponding to the voice command) for entities that are of a type associated with the determined user intent. In other words, analysing the voice command to extract one or more entities from the voice command may include searching the voice command for entities that are of a type associated with the determined user intent. In the example mentioned above in which the user intent is determined to be "play content", the system may thus search the voice command for known band names, known song names and/or known genre names. An entity may be said to be "extracted" if that entity is found during a search performed on the voice command. The search may be restricted to entity types associated with the determined user intent. This may reduce the scope of the search, so that the system may only need to search for a relatively small number of entity types in the voice command. This may serve to reduce a time taken to perform the search (e.g. compared to a case where a global search for entities is performed on the voice command). By targeting the search so that it is aimed at specific entity types, the likelihood of finding the correct entity in the voice command may be improved. As a result, the user may be more likely to obtain the desired outcome when issuing a voice command to the playback device, thus facilitating control of the playback device.

Herein, an "entity" may correspond to a phrase (or term) contained in the voice command. An entity may comprise one term (or word), or multiple terms which together form the entity. For example, the band name "The Moody Blues" may constitute a single entity, where the entity type is "band name". An entity may serve to provide information relating to how the user wishes the playback device to be controlled. An "entity type" may serve to describe a group of entities which are all in a same category (e.g. "song names"), and/or which all correspond to a common function.

The one or more extracted entities may herein also be referred to as an extracted list of entities. The extracted list of entities may thus include one or more entities extracted from the voice command. The extracted list of entities is used to control the playback device, e.g. the extracted list of entities may be used as an input for controlling the playback device. For example, the extracted entities may be used as inputs in an algorithm that is used to control the playback device. Control of the playback device may also be based on the determined user intent, e.g. it may be based on the extracted entities and the determined user intent. For example, where the user intent was determined to be "play content", and the extracted list of entities includes "Beethoven", the system may control the playback device to play music from Beethoven. Controlling the playback device may include, for example, playing content via the playback device, changing a property of the playback device (e.g. audio volume, screen brightness), providing information to the user (e.g. via a speaker or a screen), and/or requesting additional information from the user (e.g. via a speaker or a screen). Other types of control of the playback device are also possible, and may depend on properties of the playback device.

In some cases, no entities may be extracted from the voice command, i.e. the extracted list of entities may be empty. This may be because no entities having a type associated with the determined user intent were found in the voice command. In such a case, the system may be configured to determine that the determined user intent is incorrect. The system may be further configured to determine a new user intent, different from the initially determined user intent. The system may then search for entities of a type associated with the new user intent in the voice command.

In some embodiments, the system may be configured to store a plurality of predefined user intents, such that the user intent is determined from the plurality of predefined user intents. The system may include a memory in which the plurality of predefined user intents is stored. The plurality of predefined user intents may together describe all the types of request that the system is designed to handle. The user request may thus be determined by determining whether one of the plurality of predefined user intents corresponds to the content of the voice command. The system may thus select one of the plurality of predefined user intents as the user intent, based on the content of the voice command. The use of a plurality of predefined user intents may simplify the step of determining a user intent, as the system may analyse the voice command in the context of a finite number of predefined user intents. This may make the system modular and extensible, as it may facilitate adding new user intents, in order to deal with different types of user requests. This may also render it possible to parallelise some of the processing performed by the system, e.g. to search for multiple intents at once.

Herein, the term "predefined" is used to indicated that the predefined user intents were defined and stored in the system (e.g. by the manufacturer) prior to use of the system, e.g. before the voice command is detected by the playback device.

In some embodiments, the system may be further configured to: store, for each of the plurality of predefined user intents, a pattern associated with that predefined user intent; and determine that a predefined user intent is the user intent if a phrase in the voice command matches the pattern associated with that predefined user intent. The patterns associated with the predefined user intents may be stored in a memory of the system. In some cases, there may be multiple patterns associated with a predefined user intent, e.g. the system may store multiple patterns per predefined user intent. As used in the field of computer programming, a "pattern" (or "regular expression") may be a sequence of characters for searching and matching text. The system may be configured to search for patterns associated with the predefined user intents in the voice command, e.g. in a string of characters corresponding to the voice command. If a pattern is found in the voice command (e.g. if there is a "match" between the pattern and a phrase in the voice command), then the predefined user intent associated with that pattern may be determined to be the user intent. The system need therefore only search for a limited number of patterns in the voice command in order to determine the user intent. This may facilitate determining the user intent, and enable rapid determination of the user intent.

The patterns associated with the predefined user intents may correspond to keywords (or key phrases) relating to the predefined user intents. The patterns associated with a predefined user intent may relate to terms or phrases that are commonly used in the context of that predefined user intent. For example, for a predefined user intent "playback control" (e.g. where the user wishes to control the playback of content being played on the playback device), associated patterns may include "play", "stop", "skip song", "next", "previous", "repeat", etc.

A pattern associated with a predefined user intent may also correspond to a phrase structure. A phrase structure may include a fixed term (or terms) and one or more variable fields. For example, for the predefined user intent "playback control", an associated phrase structure may be "increase volume to VALUE percent", where "VALUE" denotes a variable field. Thus, if the system detects the phrase structure "increase volume to VALUE percent", it may determine that the user intent is "playback control". As another example, a phrase structure associated with the predefined user intent "play content" may be "SONG by ARTIST", where "SONG" is a variable field corresponding to a song name and "ARTIST" is a variable field corresponding to an artist name.

In some embodiments, the plurality of predefined user intents may be stored as an ordered list, and the system may be configured to iteratively determine whether a predefined user intent is the user intent in the order in which the plurality of predefined user intents is stored. In other words the system may be configured to search for patterns associated with the predefined user intents in the voice command according to the order in which the plurality of predefined user intents is stored in the ordered list. For example, the system may start by searching for a first pattern associated with the first predefined user intent in the ordered list. Then, if no match is found in the voice command for the first pattern, the system may move on to search for a second pattern associated with the second predefined user intent in the order list. Where there are multiple patterns associated with a predefined user intent, the system may be configured to search for each pattern associated with that predefined user intent, before moving on to the next predefined user intent in the ordered list.

The system may be configured to stop the iterative process of determining whether a predefined user intent is the user intent as soon as a match between a pattern and a phrase in the voice command is found. In this manner, the system need not search for patterns associated with predefined user intents in the ordered list that that are located after the predefined user intent that was determined to be the user intent. The ordered list may be ordered so that more important or common user intents are towards the beginning of the list. In this manner, important or common user intents may be rapidly determined, by checking the ordered list of predefined user intents in order. In some cases, there may be a possibility that a phrase in the voice command can be matched by patterns corresponding to multiple different predefined user intents, e.g. there may be a conflict between predefined user intents. By placing the more important or common predefined user intents towards the beginning of the ordered list, conflicts with less common predefined user intents may be avoided.

In some embodiments, the system may be further configured to store, for each of the plurality of predefined user intents, an entity type associated with that predefined user intent. The entity types associated with the predefined user intents may be stored in a memory of the system. Thus, when a predefined user intent is determined to be the user intent, the system may search the voice command for entities of the entity type associated with that predefined user intent. In some cases, there may be multiple entity types associated with a predefined user intent, e.g. the system may store multiple entity types per predefined user intent.

In some embodiments, the system may be further configured to: for a first entity type stored by the system, store a plurality of regular expressions associated with the first entity type; and extract an entity of the first entity type from the voice command by matching a phrase in the voice command with one of the plurality of regular expressions associated with the first entity type. The plurality of regular expressions may be stored in a memory of the system. A regular expression may be a sequence (string) of characters for searching and matching text. A regular expression may correspond to a term (e.g. a word) or a phrase. The plurality of regular expressions may be a list of regular expressions corresponding to the entity type. For example, where the entity type is "band name", the plurality of regular expressions may correspond to different band names. Where the entity type is "decades", the plurality of regular expressions may correspond to the different manners in which decades can be referred to. The plurality of regular expressions may be compiled (e.g. by a system administrator) based on the content and services which are available to the user via the system. This may make the system easily extensible, as it is possible to add new regular expressions corresponding to the first entity type.

Thus, when the system searches for entities of the first entity type in the voice command, the search may be limited to the plurality of regular expressions stored by the system. This may enable the search to be performed rapidly. Indeed, this configuration may avoid the system having to search through large databases of regular expressions in order to find a match with a phrase in the voice command. This configuration may also increase the chances of extracting a relevant entity from the voice command, as only entities corresponding to the stored regular expressions may be extracted.

In some embodiments, the system may be further configured to: for a second entity type stored by the system, store a phrase structure associated with the second entity type; and extract an entity of the second type from the voice command by matching a phrase in the voice command with the phrase structure associated with the second entity type. The phrase structure may be stored in a memory of the system. A phrase structure may include a fixed term (or terms) and one or more variable fields. In some cases, a phrase structure may relate an entity of the second type to an entity of another type. An entity of the second type may be extracted from the voice command by searching for a phrase in the voice command having the phrase structure.

The phrase structure may, for example, include a field corresponding to an entity of the second type and a field corresponding to an entity of another type. Using such a phrase structure may facilitate extracting an entity of the second type, e.g. by searching for an entity of the second type in relation to the entity of the other type. Searching for a second entity type in relation to another entity type may serve to restrict the search to a smaller set of entities (e.g. because the entities of the second type must all relate to the entity of the other type). Recognising phrase structures in a voice command may facilitate extracting entities from the voice command, by recognising terms in certain positions in a phrase as having a particular entity type.

The phrase structure may have a song field and an artist field, e.g. it may have the form "SONG by ARTIST", where "SONG" and "ARTIST" correspond to the song and artist fields, respectively, and "by" is a fixed term in the phrase structure. Here, "song names" may be the second entity type, and "artist names" may be the other entity type.

Herein, an entity type may also be referred to as a category of entities. Thus, the first entity type may correspond to a first category of entities stored by the system, and the second entity type may correspond to a second category of entities stored by the system.

The system may be configured to: determine an artist name from the phrase in the voice command, the artist name being a string in the phrase that is at a position corresponding to the artist field in the phrase structure; obtain from a database a list of song names associated with the artist name; and extract the entity of the second type by matching a song name in the list of song names with a string in the phrase that is at a position corresponding to the song field. In this manner, the system may only search for song names that are associated with the identified artist name. By restricting the search for entities of the second type to the list of song names associated with the artist name, the number of entities searched for in the voice command may be greatly reduced (as the number of songs associated with the artist may be much smaller than a total number of songs). This may also improve the chances of extracting the correct song name. Additionally, this configuration may avoid having to make repeated queries to the database.

With the phrase structure "SONG by ARTIST", the system may initially determine whether the term "by" is present in the voice command. If it is, the system may then determine whether a phrase following the term "by" in the voice command corresponds to an artist name (e.g. using stored regular expressions associated with the artist name entity type). If an artist name is found, then a phrase preceding the term "by" may be searched for song names associated with the artist (e.g. using stored regular expressions associated with the song name entity type).

In some embodiments, controlling the playback device based on the one or more extracted entities may include selecting an entity from the one or more extracted entities based on a set of conflict resolution rules, and controlling the playback device based on the selected entity. In other words, prior to controlling the playback device, the system may perform a conflict resolution step to select an entity from the extracted list of entities. This may serve to avoid potential conflicts between entities, and to base control of the playback device on the correct entity. A conflict may arise if the extracted list of entities includes two or more overlapping entities, e.g. entities which share a common string of characters. For example, the extracted list of entities may include the entities "The Moody Blues" (which is a band name) and "blues" (which is a musical genre). These entities may be said to overlap, as they both include the term "blues". Using the conflict resolution rules, the system may determine that the correct entity is "The Moody Blues" and select that entity. Control of the playback device may then be performed based on the selected entity, e.g. the playback device may be controlled to play music by the band The Moody Blues.

The set of conflict resolution rules may include one or more rules that are used by the system for selecting an entity from the extracted list of entities. The set of rules may be stored in a memory of the system. The set of rules may be in the form of an algorithm for selecting an entity form the extracted list of entities. In some cases, the set of conflict resolution rules may enable the system to select multiple non-conflicting entities from the extracted list of entities. In such a case, control of the playback device may be based on the multiple non-conflicting entities.

The set of conflict resolution rules may be set such that, when the extracted list of entities includes two or more overlapping entities, the longest entity of the overlapping entities is selected. The system may thus be configured to select the overlapping entity having the most characters. Thus, in the example mentioned above, where the extracted list of entities includes "The Moody Blues" and "blues", the conflict resolution rules may cause the system to select the entity "The Moody Blues", as it is the longer of the two. This may enable accurate interpretation of the user's voice command.

Additionally or alternatively, the set of conflict resolution rules may be set such that, when the extracted list of entities includes two or more overlapping entities, one of the overlapping entities having a prioritized entity type is selected. Some entity types may be prioritized over others, e.g. entity types may be ranked in an order of priority. In this manner, when there is a conflict between entities of different types, the entity having the highest priority may be selected. For example, an entity type "genre" may be preferred over an entity type "mood". The order of priority of the entity types may be set according to a likelihood of the user using a phrase corresponding to that entity type. This may enable accurate interpretation of the user's voice command.

In some embodiments, selecting an entity from the one or more extracted entities may include identifying word boundaries in the voice command, and discarding entities which do not start and end at identified word boundaries. Discarding an entity may mean that that entity is not selected. A word boundary may correspond to a position in a string of characters where a word starts or ends. A word may thus be defined by a pair of word boundaries in a string of characters, e.g. one boundary for the start of the word, and one boundary for the end of the word. Word boundaries may be identified using conventional word boundary matching techniques. A string of characters corresponding to the voice command may be analysed to identify word boundaries in the voice command. For each of the extracted entities, the position in the string of that entity may then be compared with the identified word boundaries, to determine whether it starts and ends at identified word boundaries. If it does not, then that entity may be discarded (i.e. it is not selected). Discarding entities that do not start and stop at identified word boundaries may serve to ensure that only entities consisting of whole words are selected. This may avoid selecting incorrect entities, to improve accuracy of interpretation of the voice command.

In some embodiments, controlling the playback device may include playing content via the playback device. For example, where the system determines that the user's intent is to play content, and an extracted entity is "band A", the system may control the playback device to play music by band A. In other examples, the system may determine that further information is required from the user. In this case, system may control the playback device to ask the user for additional information (e.g. via a speaker in the playback device).

In some embodiments, controlling the playback device may include generating or adapting a content playlist, and playing the content playlist via the playback device. Herein a "playlist" may refer to a list of content items (e.g. audio or video files) that are to be played sequentially or, in some cases, in random order. The playlist may be generated or adapted based on the extracted list of entities (or where an entity is selected, on the selected entity). For example, where the system extracts the entity "classical music" from the voice command, the system may generate a playlist based on that entity, and play the generated playlist via the playback device. The playlist may be stored in a memory of the system.

In some embodiments, the system may further comprise a content server configured to store content that is playable by the playback device. The system may access content on the content server, and control the playback devices to play content from the content server. Where the system generates a playlist, the system may generate the playlist from the content stored on the content server.

In some embodiments, the system may further comprise a controller separate from the playback device, the controller being configured to control the playback device. In other words, all or a portion of the processes performed for controlling the playback device may be performed by the controller. Controlling the playback device with a separate controller may serve to simplify the configuration of the playback device. In particular, only a minimal amount of processing may be required to take place at the playback device, with most of the processing taking place at the controller. This may also simplify the firmware that is required on the playback device. For example, the steps of determining user intent, extracting a list entities from the voice command and selecting an entity based on conflict resolution rules may be performed by the controller.

The controller may be connected to the playback device, in order to control the playback device and receive data (e.g. voice commands) from, and transmit data to, the playback device. For example, the playback device may be connected to the controller via a computer network. The playback device may include a network interface for connecting the playback device to a network, e.g. via a wireless connection or via a wired connection. In some examples, the controller may be connected to the playback device via the internet, e.g. the controller may be implemented by a computer or server connected to the internet (e.g. a "cloud server"). In some cases, a single controller may be used to control multiple playback devices.

The playback device may be configured to transmit a detected voice command to the controller, so that the controller may analyse the voice command. For example, the playback device may transmit a recording or an audio stream of the voice command to the controller. The controller may then analyse the voice command, to determine the user intent and extract a list of entities. The controller may then control the playback device. For example, where the controller determines that the user wishes to play music by band A, the controller may transmit corresponding audio content to the playback device, together with an instruction to play the audio content. The controller may also transmit different types of instructions to the playback device, e.g. turn device on/off, turn volume of speaker up/down, display text on screen, etc. The controller may control the playback device to play content, and/or to communicated with the user (e.g. to ask the user a question).

The content server may be part of the controller, or separate from the controller.

In some embodiments, the playback device may comprise a speaker for playing audio content.

According to a second aspect of the invention, there is provided a method of controlling a playback device, the playback device being configured to detect a voice command from a user and to play content, the method comprising: analysing a voice command detected by the playback device to determine a user intent; analysing the voice command to extract one or more entities from the voice command, wherein each of the extracted entities is of a type associated with the determined user intent; and controlling the playback device based on the one or more extracted entities. Features of the first aspect of the invention are shared with the second aspect of the invention, and are not discussed in detail again. The method of the second aspect of the invention may correspond to a method of controlling the system of the first aspect of the invention.

The second aspect of the present invention may optionally have any one, or, to the extent they are compatible, any combination of the following optional features.

The method may further comprise storing a plurality of predefined user intents, wherein the user intent is determined from the plurality of predefined user intents.

The method may further comprise: storing, for each of the plurality of predefined user intents, a pattern associated with that predefined user intent; and determining that a predefined user intent is the user intent if a phrase in the voice command matches the pattern associated with that predefined user intent.

In some embodiments, the plurality of predefined user intents may be stored as an ordered list, and the method may further comprise iteratively determining whether a predefined user intent is the user intent in the order in which the plurality of predefined user intents is stored.

The method may further comprise storing, for each of the plurality of user intents, an entity type associated with that predefined user intent.

The method may further comprise storing, for a stored first entity type, a plurality of regular expressions associated with the first entity type; and extracting an entity of the first entity type from the voice command by matching a phrase in the voice command with one of the regular expressions associated with the first entity type.

The method may further comprise storing, for a stored second entity type, a phrase structure associated with the second entity type; and extracting an entity of the second entity type from the voice command by matching a phrase in the voice command with the phrase structure associated with the second entity type.

In some embodiments, the phrase structure may have a song field and an artist field, and the method may further comprise: determining an artist name from the phrase in the voice command, the artist name being a string in the phrase that is at a position corresponding to the artist field in the phrase structure; obtaining from a database a list of song names associated with the artist name; and extracting the entity of the second type by matching a song name in the list of song names with a string in the phrase that is at a position corresponding to the song field.

In some embodiments, controlling the playback device based on the one or more extracted entities may include selecting an entity from the one or more extracted entities based on a set of conflict resolution rules, and controlling the playback device based on the selected entity.

BRIEF DESCRIPTION OF THE DRAWINGS

Examples of the invention are discussed below with reference to the accompanying drawings, in which.

DETAILED DESCRIPTION

Figure 1:
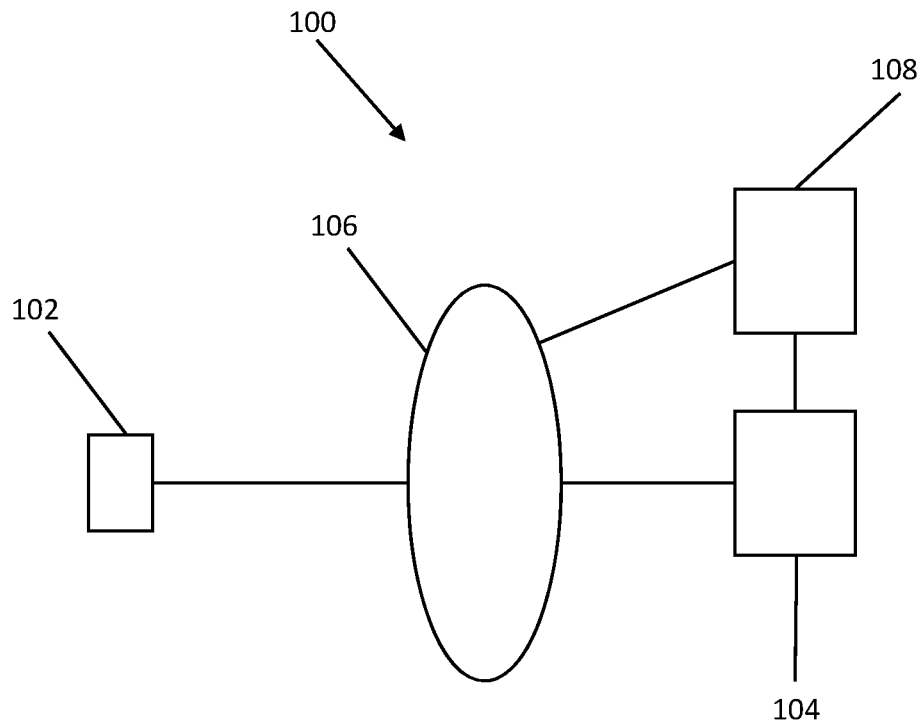
FIG. 1 is a schematic diagram of a content playback system that is an embodiment of the invention.

FIG. 1 is a schematic diagram showing a content playback system 100 that is an embodiment of the invention. The content playback system 100 includes a playback device 102. In the embodiment, the playback device 102 includes a speaker for playing audio content, and a microphone for detecting voice commands from a user. The playback device is discussed in more detail below in relation to FIG. 2. The content playback system 100 further includes a controller 104. The controller 104 is communicatively coupled to the playback device 102 via a computer network 106. The computer network 106 may include any suitable type of computer network, such as a local area network (LAN), a telecommunications network or the internet. For example, the playback device 102 may be connected to the controller 104 via the internet. The playback device 102 and the controller may communicate using any suitable communication protocol. The controller 104 is also communicatively coupled to a content server 108 for storing content (e.g. a plurality of media items such as audio files) that is playable by the playback device 102.

The playback device 102 may be a conventional voice-controlled speaker which is connectable to a network. A playback device may also be implemented by a user's smartphone or any other suitable device having a microphone, a speaker and a network interface. The playback device 102 may be connectable to a network wirelessly (e.g. via Wi-Fi or Bluetooth), or via a wired connection (e.g. Ethernet). In some cases, the playback device may be portable, e.g. it may be carried around by a user.

Figure 2:
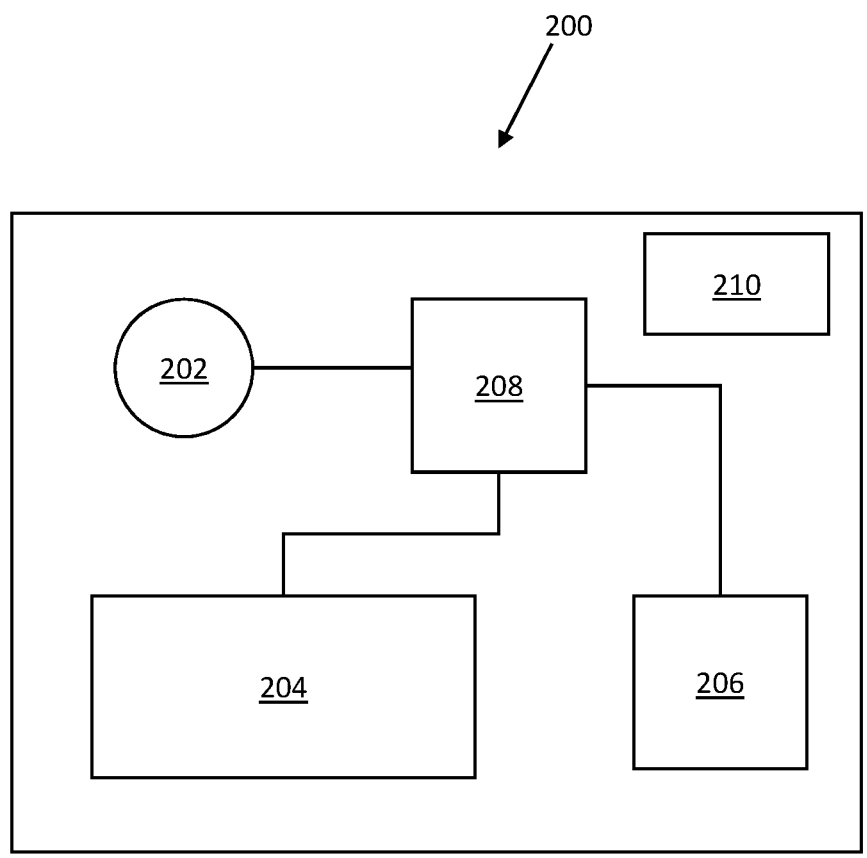
FIG. 2 is a schematic diagram of a playback device that may be used as part of a content playback system that is an embodiment of the invention.

FIG. 2 is a schematic diagram showing the components in a playback device 200 that may be used in a content playback system according to an embodiment of the invention (e.g. system 100). Playback device 200 includes a microphone 202 for detecting voice commands from a user, a speaker 204 for playing audio content, and a network interface 206 for connecting the playback device 200 to a computer network. The playback device 200 includes a device controller 208 which is connected to each of the microphone 202, the speaker 204 and the network interface 206. The playback device 200 also includes a power supply 210 for powering the playback device 200. The power supply 210 may include a battery (e.g. where the playback device is portable) and/or a power input connection for receiving power from an external power source.

The device controller 208 is configured to control each of the microphone 202, the speaker 204 and the network interface 206. In particular, the device controller 208 is configured to control the network interface 206 to transmit data to, and receive data from, an external device (e.g. the controller 104) via the network interface 206. The device controller 208 is configured to control the speaker 204 to play audio content via the speaker 204 (e.g. content received from the controller 104 via the network interface 206). The speaker 204 may also be used to communicate with the user, e.g. to ask the user questions or provide information to the user. The device controller 208 is also configured to control the microphone 202 to detect and/or record audio from the environment. In particular, the device controller 208 is configured to detect voice commands via the microphone 202, and transmit the voice commands to an external device (e.g. controller 104) via the network interface 206. For example, when the microphone 202 picks up sound above a predetermined threshold, the device controller 208 may be configured to transmit a recording or live stream of the audio picked up by the microphone to the controller 104. Alternatively, the playback device may be configured to detect a voice command when it detects a "wake word" (e.g. the user may say the wake work at the beginning of the voice command). The device controller 208 may be configured to cancel signals detected by the microphone which correspond to audio being played by the speaker 204. This may improve detection of voice commands. In this manner, voice commands from a user detected at the playback device 200 may be transmitted to the controller 104 of the content playback system.

Returning to FIG. 1, the controller 104 may be implemented by a computer or server having software installed thereon for controlling the playback device 102 and carrying out the processes discussed below on a processor suitably configured by such software. Where the controller 104 is connected to the playback device 102 via the internet, it may be referred to as a "cloud server". In this case, the content playback system may be provided as an online service which the user can sign up to. The controller 104 may include a memory in which the software for controlling the playback device is stored. The controller 104 may also store content which is playable by the playback device 102.

The content on the content server 108 is accessible by the controller 104. The controller 104 may transmit content stored on the content server 108 to the playback device 102 over the network 106, so that the content can be played by the playback device 102. The controller 104 may also transmit instructions to the playback device 102 in order to control the playback device 102. When the playback device 102 receives an instruction from the controller 104, the device controller (e.g. device controller 208) of the playback device 102 may interpret the instruction and control the components of the playback device 102 accordingly. For example, the controller 104 may instruct the playback device 102 to play content, to switch itself on or off, or to increase/decrease speaker volume.

In some embodiments, the playback device 102 may be communicatively coupled to the content server 108 via the computer network 106 (as shown in FIG. 1). In this case, the playback device 102 may retrieve content directly from the content server 108 so that the controller 104 does not have to transmit content from the content server 108 to the playback device 102. To do this, the controller 104 may transmit an address to the playback device 102, indicating where the content to be played is stored.

The content playback system 100 enables a meaning to be extracted from a voice command detected by the playback device 102, to facilitate control of the playback device 102 using voice commands. To achieve this, the controller is configured to carry out multiple stages of analysis. First, the controller 104 analyses a detected voice command to determine a user intent, e.g. the type of request made by the user. Second, the controller 104 analyses the voice command to extract entities from the voice command, the entities all being of a type associated with the determined user intent. Third, the controller 104 performs a conflict resolution step, to select the correct entity (or entities) amongst the extracted entities. Subsequently, the controller 104 may control the playback device 102 based on the selected entities.

The user intent corresponds to a type of request made by the user, and is typically associated with a type of action that the user wishes the playback device to perform. For example, the user may request the playback device to play music from band A. In this case the user intent may be "play content", as the user wants content to be played via the playback device. Other examples of possible user intent include "generate new playlist", "change audio volume", "playback control", "request information", "indicate preference". Many other types of user intent are also possible. Table 2 below shows a set of predefined user intents used in an embodiment of the invention.

The controller 104 stores a plurality of predefined user intents in a memory of the controller 104. Together, the predefined user intents describe all of the types of request that the content playback system is intended to handle. The user intent is determined from the stored predefined user intents, by analysing the voice command to determine which (if any) of the predefined user intents corresponds to the user's request. In other words, the controller 104 is configured to analyse the user voice command in the context of the predefined user intents.

The controller 104 also stores a set of patterns associated with each stored predefined user intent. The pattern may be a so called regular expression that corresponds to a keyword or key phrase corresponding to the predefined user intent. Such regular expressions are well understood in the field of computer science, so no detailed description is required here. The patterns associated with a predefined user intent may correspond to terms or phrases that are commonly used in the context of that predefined user intent. The controller 104 is configured to determine the user intent by searching for patterns associated with the predefined user intents in the voice command. If a match is found between a pattern and a phrase in the voice command, the predefined user intent corresponding to that pattern may be determined to be the user intent.

Figure 3:
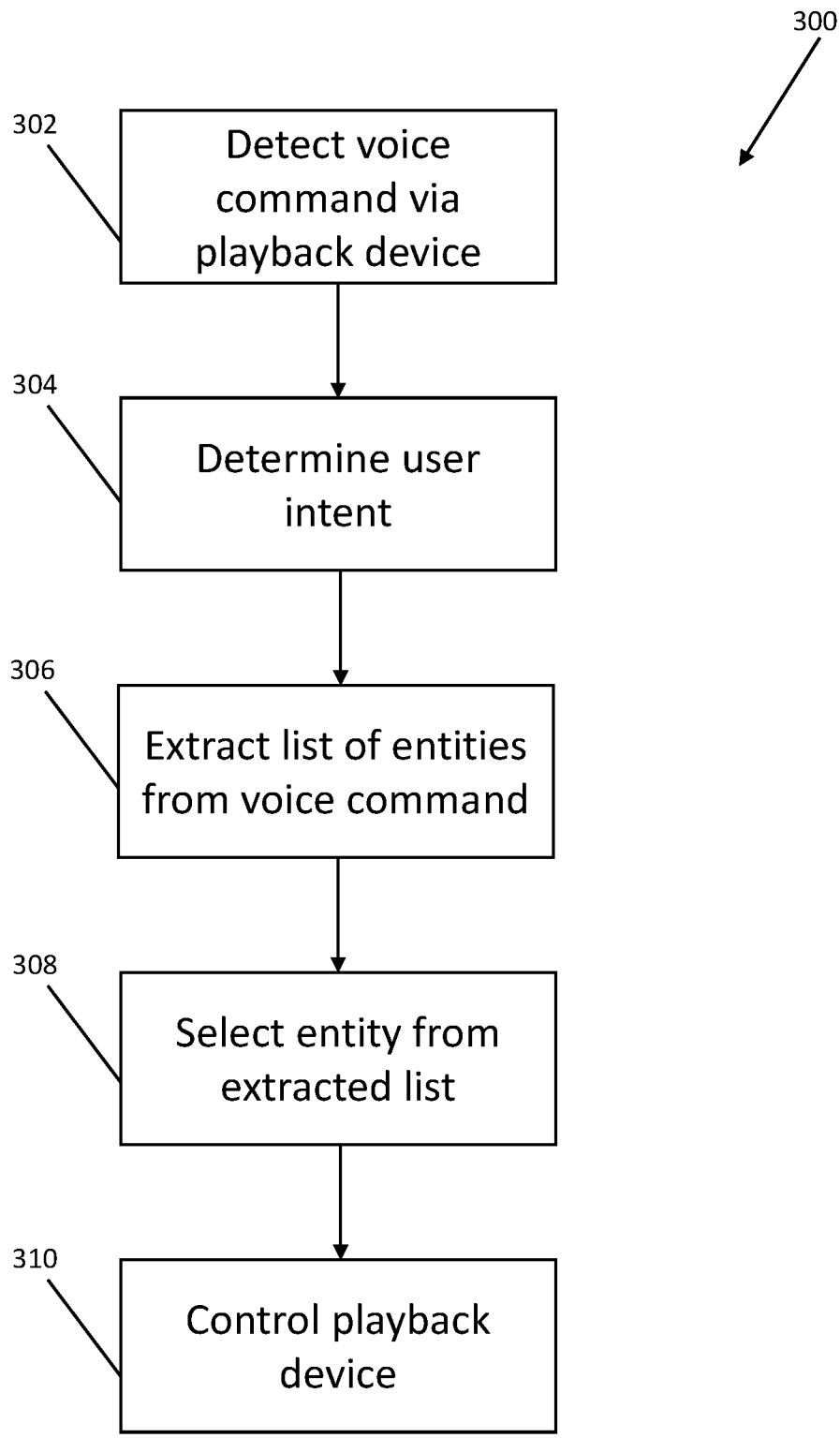
FIG. 3 is a flow-diagram illustrating an operation of a content playback system that is an embodiment of the invention.

FIG. 3 shows a flow diagram 300 which summarises operation of playback system 100. In step 302 of FIG. 3, a voice command from a user is detected via the playback device 102. The voice command is then transmitted to the controller 104, which analyses the voice command to determine the user intent (step 304). Once the controller 104 has determined the user intent, in step 306 the controller 104 extracts a list of entities from the voice command, each of the extracted entities being of a type associated with the determined user intent. In step 308 the controller 104 selects one or more entities from the list of extracted entities, based on a set of conflict resolution rules. Then, in step 310, the controller 104 controls the playback device 102, based on the determined user intent and the selected entity (or entities). Each of the steps in FIG. 3 is described in more detail below.

In step 302, when the playback device 102 detects a voice command (e.g. via microphone 202), the playback device 102 is configured to transmit the voice command to the controller 104 (e.g. as an audio file). The controller 104 may then store the voice command in a local memory so that the voice command may be analysed.

A process for determining user intent in step 304 will now be described. The controller 104 is configured to convert the received voice command to a string of characters. This may be performed using conventional speech recognition software and techniques for converting speech to text. The string of characters corresponding to the voice command is then analysed to determine the user intent.

Algorithm 1 and Algorithm 2 below may be executed by the controller 104 to determine the user intent. All of the algorithms shown below are given in a simplified programming language (i.e. pseudo-code) for illustrative purposes. These are example algorithms, and other algorithms may also be used for determining the user intent.

| Algorithm 1: |  |
|---|---|
| 1. | intents := get-intents( ) |
| 2. | for intent in intents: |
| 3. | if (recognise(intent, phrase)) : |
| 4. | return (intent, extract(intent, phrase)) |
| 5. | return nothing |

In Algorithm 1 above, "phrase" is a string of characters corresponding to the user's voice command.

The operation get-intents( ) returns a sequence of all of the predefined intents stored by the controller.

The operation recognise(intent, phrase) determines whether the predefined user intent ("intent") is the user intent. See Algorithm 2, below, for more details.

The operation extract(intent, phrase) extracts entities from the voice command ("phrase") corresponding to the user intent. See the discussion on entity extraction, below, for more details.

The operation return( ) outputs a set of values corresponding to the expression(s) in the brackets.

Thus, in line 1 of Algorithm 1, the variable "intents" is set to a list of all the predefined user intents stored by the controller. Lines 2-4 correspond to a "for" loop, i.e. an iterative loop that is performed for individual predefined user intents in "intents", in the order in which they are listed. The order in which the operation get-intents( ): returns the list of predefined user intents may be set such that the more important or more common user intents appear towards the beginning of the list. For instance, the predefined user intents may be stored in an ordered list on the controller. In this manner, the more important or common predefined user intents will be checked first. This may enable the user intent to be determined more rapidly, and avoid conflicts with other predefined user intents.

In line 3 of Algorithm 1, if it is determined that the predefined user intent that is being checked corresponds to the user intent, then that predefined user intent is used to extract entities from the voice command. The user intent and extracted entities are then output by the algorithm (line 4).

| Algorithm 2: |  |
|---|---|
| 1. | patterns := get-intent-patterns(intent) |
| 2. | phrase := normalise(phrase) |
| 3. | phrase := remove-useless-words(intent, phrase) |
| 4. | if (is-blank?(phrase)) |
| 5. | return false |
| 6. | else |
| 7. | for pattern in patterns: |
| 8. | if matches(pattern, phrase) |
| 9. | return true |
| 10. | return false |

Algorithm 2, above, may be called "recognise" and corresponds to the process that is carried out in response to receiving the command "recognise(intent, phrase)" (see line 3 of Algorithm 1). The parameter "intent" corresponds to the predefined user intent that is being checked in line 3 of Algorithm 1. The parameter "phrase" corresponds to the string of characters corresponding to the voice command.

The operation get-intent-patterns(intent) returns the set of patterns that are associated with the predefined user intent being checked. Input "intent" corresponds to the predefined user intent being checked in line 3 of Algorithm 1.

The operation normalise(phrase) converts input "phrase" into a consistent format, so that non-essential details are removed. For example normalise("play"), normalise ("play"), and normalise("PLAY") will all return the same string.

The operation remove-useless-words(intent, phrase) removes words and phrases that are deemed non-essential for interpreting the voice command, e.g. "please" and "thank you". The predefined intent ("intent") is used as an input for this operation, so the types of words that are deemed non-essential may depend on the predefined intent.

The operation is-blank?(phrase) returns true if "phrase" is empty. For example, if "phrase" initially only contained words that are deemed non-essential, then "phrase" may be empty following the operation remove-useless-words(intent, phrase).

The operation matches(pattern, phrase) returns true if the input "pattern" matches a portion (or all) of "phrase". This may be done by searching for "pattern" in "phrase", using conventional text searching techniques.

So, in line 1 of Algorithm 2, the variable "patterns" is set to the set of patterns stored by the controller and associated with the predefined user intent being checked ("intent"). In lines 2-3, "phrase" is converted so that non-essential characters and words are discarded. If the converted "phrase" isn't empty, the operation is-blank?(phrase) will return true and the algorithm will move on to lines 7-10. Lines 7-10 are a "for" loop where each of the set of patterns in "patterns" is successively checked. In line 8, if the pattern being checked matches a string in "phrase", the algorithm returns true (line 9); otherwise the algorithm returns false (line 10).

If a pattern is matched in line 9 of Algorithm 2, then the predefined user intent associated with that pattern is determined to be the user intent. Then, recognise(intent, phrase) in line 2 of Algorithm 1 would return true, and the determined user intent would be returned in line 4 of Algorithm 1. The determined user intent would also be used to extract entities from the voice command in line 4 of Algorithm 1, using the operation extract(intent, phrase).

Once the user intent has been determined as described above, the controller 104 is configured to extract entities from the voice command (step 306 in FIG. 3).

The controller 104 stores one or more entity types for each predefined user intent. When the controller 104 determines that a predefined user intent is the user intent, the controller 104 searches for entities that are of a type associated with that predefined user intent. This corresponds to the operation "extract(intent, phrase)" in line 4 of Algorithm 1. In this manner, the search for entities in the voice command is limited to specific entity types. An entity may be a term (e.g. word) or a phrase consisting of multiple terms. An entity type may serve to describe a group of entities which are in a same category (e.g. "song names", "band names"). For example, the band name "The Moody Blues" may be an entity, the entity type being "band name". The following are examples of entity types relating to music, with examples of corresponding entities given in brackets:

Artist (e.g. Jay-Z, The Prodigy);
Genre (e.g. hip hop, blues, rock);
Speed (e.g. fast, slow);
BPM (beats per minute, e.g. 120 bpm)
Era (e.g. 40 s, 1960s, "naughties");
Song (e.g. Bohemian Rhapsody);
Year (e.g. 2018, '99);
Special event (e.g. Glastonbury festival, Christmas)
Concept (e.g. ideas that user could ask for, such as "gardening music");
Location (e.g. city names, country names, region names, etc.);
Mood (e.g. relaxing, happy);
Radio station (e.g. radio station names);
Role (e.g. "drummer", "guitarist").

Entities of different types may be extracted from the voice command in different manners. Many entity types can be exhaustively enumerated. For example, it may be possible to exhaustively enumerate all of the different manners in which eras or decades can be referred to. Similarly, it may be possible to exhaustively enumerate all band names of the most popular bands on a particular music platform.

In the case of an entity type that can be exhaustively enumerated (referred to herein as a first entity type), the controller 104 may store a plurality of regular expressions associated with that entity type. The plurality of regular expressions may correspond to a list of entities of the first entity type. The controller 104 may then extract an entity of the first type by searching for regular expressions associated with the first entity type in the voice command. For example, this may be done by iteratively searching for each of the regular expressions associated with the first entity type in the voice command. This may enable rapid identification of entities of the first type within the voice command. This may be particularly useful for entity types that are commonly used by the user. For example, for the entity type "Popular Artists", the controller may store a plurality of regular expressions corresponding to e.g. the 15,000 most popular artist names on a particular music platform. Similarly, for the entity type "Popular Songs", the controller may store a plurality of regular expressions corresponding to the most popular songs on a particular music platform.

However, for certain entity types, it may not be possible or practical to define regular expressions for every single possible entity of that entity type. Such an entity type which is not fully enumerated may be referred to as a second entity type. For example, apart from the most popular songs, it may be too time consuming to define a regular expression for each song name. It may instead be more practical to qualify a song by an artist name, and search for the song in the context of the artist name. This may be done by defining a phrase structure, and identifying the phrase structure in the voice command. An example phrase structure is "SONG by ARTIST", where "SONG" is a song name field, "ARTIST" is an artist name field, and "by" a fixed term in the phrase structure which links the artist name and song name fields. Algorithm 3 below is an example algorithm showing how the controller may extract an entity of the second type from a voice command.

Algorithm 3:

1. (start, end) := position (" by ", phrase)
2. song-phrase := substring(0, start, phrase)

```
Algorithm 3:

3.      artist := match-artist(substring(end, length(phrase),
phrase))
4.      artist-songs := lookup-songs(artist)
5.      for artist-song in artist-songs:
6.          if normalise(song-phrase) == normalise(artist-song):
7.              return artist-song
8.      return nothing
```

The parameter "phrase" corresponds to the string of characters corresponding to the voice command.

The operation position(pattern, phrase) returns a tuple of a start and an end position of "pattern" in phrase. So, in the example given, position("by", phrase) returns a tuple of the start position and the end position of the string "by" in the voice command ("by" is the word "by" with a space on either side). The tuple returned by the operation has the form (start, end), where "start" and "end" are the start and end positions of the pattern in the voice command.

The operation substring(start, end, phrase) returns a portion of "phrase", starting at character number start and ending at character number end. So substring(0, start, phrase) returns a portion of "phrase" starting at character number 0 and ending at character number start (obtained in line 1).

The operation length(phrase) returns the number of characters in "phrase".

The operation match-artist(pattern) returns the artist name in "pattern". This may be performed as described above for the first entity type. In particular, the controller may store regular expressions for a plurality of artist names, and search for those regular expressions in "pattern". If a portion of "pattern" matches a regular expression, the corresponding artist name is returned. So, in line 3 of Algorithm 3, operation match-artist(substring(end, length(phrase), phrase)) searches for an artist name in the portion of "phrase" following the string "by" (i.e. the portion from character number end to character number length(phrase)).

Operation lookup-songs(artist) returns a list of songs by "artist", e.g. that are stored in the controller or on the content server.

Operation normalise(string) converts "string" into a consistent format, so that non-essential details are removed. For example normalise("Bohemian Rhapsody"), and normalise ("bohemian rhapsody") will return the same string.

Algorithm 3 therefore defines a phrase structure of the form "SONG by ARTIST", where "SONG" and "ARTIST" are song and artist fields, respectively. Algorithm 3 starts by identifying the position of the string "by" in "phrase" (line 1 of Algorithm 3). Then, the part of "phrase" corresponding to the "SONG" field is identified as the portion of "phrase" before "by" (line 2 of Algorithm 3). The part of "phrase" corresponding to the "ARTIST" field is identified as the portion of "phrase" after "by", and an artist name is identified from the "ARTIST" field (line 3 of Algorithm 3). In line 4 of Algorithm 3, a list of songs corresponding to the identified artist name is looked up. Lines 5-7 of Algorithm 3 define an iterative loop, where each song name in the list of songs is compared to the "SONG" field of "phrase". If a match is found, then the corresponding song name is returned.

Thus, in Algorithm 3 the search for a song name is restricted to song names associated with the identified artist. This may simplify the process of searching for a song name in the voice command, and increase the chances of extracting the correct song name. Additionally, by defining a phrase structure (e.g. "SONG by ARTIST"), song names and artist names need only be searched for in respective portions of the voice command. This may facilitate identifying the artist and song names, and increase the chances of an accurate match.

Other methods for extracting entities, other than those discussed above may also be used.

Following the steps of determining user intent and extracting entities from the voice command, the controller 104 may have a list of extracted entities (e.g. stored in a memory of the controller). In some cases, there may be conflicts between two or more of the extracted entities. There may be a conflict between two extracted entities where the two entities overlap. For example, the list of extracted entities may include the entities "The Moody Blues" (band name) and "blues" (genre name). These two entities are said to overlap because they both include the string "blues". In this case, the controller 104 must determine which is the correct entity and select the correct entity (step 308 of FIG. 3), so that the playback device may be controlled based on the correct entity.

Multiple different conflict resolution methods may be used. Algorithms 4 and 5 below give examples of possible algorithms for selecting entities from a list of extracted entities.

```
Algorithm 4:

1.      resolved-entities := array( )
2.      do
3.          current := pop (entities)
4.          next := pop(entities)
5.          if next == null OR end(current) < start (next)
6.              push(current, resolved-entities)
7.              if next !=null
8.                  push(next, entities)
9.          else
10.             if length(current) > length(next)
11.                 push(current, entities)
12.             else if length(next) > length(current)
13.                 push(next, entities)
14.             else if type(current) == "genre"
15.                 push(current, entities)
16.             else if type(current) == "mood"
17.                 push(current, entities)
18.             else
19.                 push(next, entities)
20.     while length(entities) > 0
21.     return resolved-entities
```

Algorithm 4 is an algorithm for resolving conflicts between two or more overlapping entities in a list of extracted entities. Algorithm 4 applies a set of conflict resolution rules for selecting the correct entity (or entities) from the list of extracted entities. Algorithm 4 is configured to preferentially select longer entities over shorter ones (e.g. it may select "Acid House" over "House"); in other cases, it is configured to preferentially select entities corresponding to the entity type "genre"; and in other cases, it is configured to preferentially select entities corresponding to the entity type "mood". In other examples, different conflict resolution rules may be used, and different entity types may be preferentially selected or prioritized.

The parameter "entities" in Algorithm 4 corresponds to an array of entities that have been extracted from the voice command. The array is ordered by start position of each entity in the string of characters corresponding to the voice command.

The operation array( ) creates a new empty array.

The operation pop(array) removes the first element from an array and returns it; if the array is empty, the operation returns null.

The operation push(entity, array) adds an entity to the head of an array.

The operation start(entity) returns the start position of an entity in the string of characters corresponding to the voice command.

The operation end(entity) returns the end position of an entity in the string of characters corresponding to the voice command.

The operation length(entity) returns the number of characters in an entity.

The operation type(entity) returns the entity type of an entity.

So, in line 1 of Algorithm 4, the variable "resolved-entities" is set to an empty array. Lines 2-19 of Algorithm 4 correspond to a "while" loop which is performed as long as the condition length(entities)>0 is met, i.e. as long as the array "entities" is not empty. In line 3 of Algorithm 4, the variable "current" is set to the first entity of the array "entities", and this entity is also removed from "entities" (so that the array "entities" now comprises one fewer entities). In line 4 of Algorithm 4, the variable "next" is set to the first entity in the array "entities", and this entity is also removed from "entities".

In lines 5-7 of Algorithm 4, if the variable "next" is null (e.g. if it is empty) or if the end position of the variable current is smaller than the start position of the variable "next", then the "current" entity is added at the beginning of the array "resolved-entities", and the "next" entity is added at the beginning of the array "entities".

At line 5, Algorithm 4 checks whether the conditions "next==null" or "end(current)<start(next)" are fulfilled. These conditions correspond to cases where there are no conflicts. The condition "next==null" is true if there are no more entities, in which case there is no conflict and the "current" entity can be added to the array "resolved-entities". The condition "end(current)<start(next)" is true when the end of the "current" entity comes before the start of the next entity, in which case there is no conflict.

If the conditions in line 5 are not fulfilled, then Algorithm 4 checks the "current" and "next" entities against the conflict resolution rules. If the length of the "current" entity is greater than the length of the "next" entity, the "current" entity is added at the beginning of the array "entities"; otherwise, if the length of the "next" entity is greater than the length of the "current" entity, the "next" entity is added at the beginning of the array "entities"; otherwise, if the entity type of the "current" entity is "genre", the "current" entity is added at the beginning of the array "entities"; otherwise, if the entity type of the "current" entity type is "mood", the "current" entity is added at the beginning of the array "entities"; otherwise, the "next" entity is added at the beginning of the array "entities". Once the "while" loop has been completed, Algorithm 4 returns the array "resolved-entities", which corresponds to the entities selected based on the conflict resolution rules. The selected entities may then be used to control the playback device.

| Algorithm 5: |  |
|---|---|
| 1. | words := word-positions(phrase) |
| 2. | positions := set( ) |
| 3. | for word in words: |
| 4. |    for offset in word: |
| 5. |       add(offset, positions) |
| 6. | results := array( ) |
| 7. | for match in matches: |
| 8. |    if (present(get(0, match), positions) and |
| 9. |       present(get(1, match), positions)): |
| 10. |       push(match, results) |
| 11. | return results |

Algorithm 5 is configured to identify the positions of word boundaries in the string of characters corresponding to the voice command, and to select only the extracted entities which start and end at identified word boundaries. In this manner, entities which are not composed of full words may be discarded. This may avoid controlling the playback device based on an incorrect entity.

As above, the parameter "phrase" is the string of characters corresponding to the voice command. The parameter "matches" is a sequence of positions of extracted entities in the string of characters corresponding to the voice command. For example, the array [(0, 4), (6, 12), (8, 11)] corresponds to three extracted entities, where each tuple indicates the start position and the end position for that entity. The second element in a tuple indicates the first character than isn't part of the corresponding entity. In this example, the first entity, i.e. the one identified by (0, 4) starts at character 0 and ends at character 4.

The operation word-positions(phrase) returns a sequence of the locations of all of the words in "phrase". For example, the operation called on the phrase "word one" would return [(0, 4), (5, 8)] (counting from 0). This is illustrated in Table 1 below.

TABLE 1

| | Character positions | | | | | | | |
|---|---|---|---|---|---|---|---|---|
| Character | w | o | r | d | | o | n | e |
| Position | 0 | 1 | 2 | 3 | 4 | 5 | 6 | 7 |

In the example shown in Table 1, the character "w" occurs at position number 0, and the first character not in "word" is the character at position number 4. Therefore the entity "word" may be defined by tuple (0, 4).

The operation set( ) returns an empty set, a data structure which doesn't store duplicate values.

The operation present(element, set) returns true if and only if element is present in set.

The operation add(element, set) puts element in set if it isn't already present.

The operation array( ) returns an empty array.

The operation push(element, array) adds an element to the head of an array.

The operation get(index, sequence) returns the element at index (counting from 0) in sequence. For example get(0, (2, 4, 6)) returns 2.

In line 1 of Algorithm 5, the variable "words" is set to the sequence of locations of all the words in "phrase". The positions of the words in "phrase" may be identified using conventional word boundary matching techniques. In line 2 of Algorithm 5, the variable "positions" is set to an empty array. Lines 3-5 define a "for" loop which runs for each word identified in line 1.

In lines 3-5 of Algorithm 5, the variable "offset" is iteratively set to each one of the character position numbers in "words". For example, if "words" is [(0, 4), (5, 8)], then the variable "word" first becomes (0, 4) (line 3) and then "offset" takes the values 0 then 4 (line 4). When "word" next becomes (5, 8), "offset" becomes 5 and then 8. At each iteration of the "for" loop of lines 3-5, the current value of "offset" is added to "positions". Therefore, in the example where "words" is [(0, 4), (5, 8)], "positions" would be [0, 4, 5, 8] at the end of the "for" loop.

In line 6 of Algorithm 5, the variable "results" is set to an empty array. Lines 7-10 define a "for" loop which runs for each entity in "matches" and which checks whether the entity starts and ends identified start and end positions of words in "phrase". If an entity fulfils this condition, the tuple with the start and end positions corresponding to that entity is added to the array "results". In this manner, after running Algorithm 5, the array "results" indicates all of the extracted entities that start and end at identified word boundaries in the string of characters corresponding to the voice command.

Algorithm 5 may be combined with Algorithm 4 above. For example, Algorithm 5 may be performed before Algorithm 4, so that Algorithm 4 is only performed for entities that start and end at identified word boundaries. In this manner, the chances of selecting the correct entities with Algorithm 4 may be improved.

Once an entity has been selected from the list of extracted entities in step 308, the selected entity may be used by the controller 104 to control the playback device 102 (step 310 of FIG. 3). The controller 104 may base control of the playback device 102 on the determined user intent and the selected entity. Using the selected entity and the determined user intents as inputs, the controller 104 may determine an action to be carried out by the playback device 102. The controller 104 may then transmit an instruction and/or content to the playback device 102, in order to control the playback device. For example, where the determined user intent is "play content" and the selected entity is "Bohemian Rhapsody" (song), the controller 104 may transmit an instruction to the playback device 102 to retrieve the corresponding content from the content server 108 and to play the retrieved content. In another example, the controller 104 may determine that the user intent is to play a playlist. The controller 104 may then generate an appropriate playlist from content stored in the content server 108, based on the selected entity. For example, where the selected entity is "1990s", the controller 104 may generate a playlist with music from the 1990s using content stored on the content server 108. The controller may then transmit (e.g. stream) the playlist to the playback device 102 to play the playlist via the playback device 102.

Where the user requests information (e.g. time), the controller 104 may determine that the user intent is to obtain information, and the selected entity may be "time". The controller 104 may then control the playback device to tell the user the time (e.g. via the playback device's speaker).

In some cases, the controller 104 may determine that more information is needed from the user in order to fulfil the user's request. This may be because the controller 104 was unable to validly extract any entities from the voice command, or because the controller 104 was unable to resolve a conflict between two entities. Then, the controller 104 may control the playback device to request more information from the user. For example, where the controller 104 was unable to resolve a conflict between two entities, the controller 104 may ask the user to confirm which is the correct entity.

Table 2 below shows a set of predefined user intents that may be used with a system that is an embodiment of the invention. The "Intent name" column indicates the names of the predefined user intents; the "Description" column provides brief descriptions of the corresponding user intents.

TABLE 2

List of user intents

| Intent name | Description |
| --- | --- |
| affirmative | detects when the user agrees, e.g., "yeah" |
| albuminfospecific | asking for information about a particular album e.g., "tell me about Nevermind by Nirvana" |
| artistinfo | asking for information about an artist e.g., "when was Rod Stewart born?" |
| bio | get a description of an artist e.g., "tell me more about this artist" |
| biospecific | get a description of a particular artist e.g., "tell me about Tracy Chapman" |
| command | music controls e.g., "next", "shuffle", "seek forward" |
| dislike | indicate that you don't like the current playing music e.g., "I hate this" |
| dislikespecific | indicate that you don't like a particular thing e.g., "Ed Sheeran is rubbish" |
| generateplaylist | generate a playlist of music e.g., "play Bob Dylan in the sixties" |
| gigs | get information about upcoming concerts e.g., "when are Muse playing" |
| help | describes ways to interact with the system e.g., "what can I do?" |
| like | indicate that you like the current music e.g., "I like this" |
| likespecific | indicate that you like something particular e.g., "I like rock" |
| modifytempo | indicate that you want to change the tempo of the current playlist e.g., "make it faster" |
| negative | detects when the user disagrees |
| nowplayingalbuminfo | detects request for info about the album that's currently playing e.g., "tell me about this album" |
| nowplayinginfo | detects request for info about the current track e.g., "what's this?" |
| playalbum | detects a request to play a particular album e.g., "play Five Leaves Left by Nick Drake" |
| playchart | detects a request to play chart music e.g., "play the top ten from the 5th of August 1970" |
| playlist | detects a request to play a playlist that's stored on a streaming service e.g., "play my Friday morning playlist on Tidal" |
| playlyric | detects requests to play songs by lyrics e.g., "play the song that goes "all the tables nice and clean" |

TABLE 2-continued

List of user intents

| Intent name | Description |
|---|---|
| playme | detects a request to play a playlist that is generated for the user depending on their 'taste profile' e.g., "play something I'll like" |
| playmusicbyartist | detects a request to play music by a particular artist e.g., "play music by Ryan Adams" |
| playpreset | detects a request to play a channel that's stored on the playback device e.g., "play preset 2" |
| playradiostation | detect a request to play a radio station e.g., "play BBC radio six music" |
| playsong | detect a request to play a particular song e.g., "play Voodo Child" |
| playsongnext | detect a request to queue up a song e.g., "play Summer of 69 by Bryan Adams next" |
| popular | detect a request to play songs that are currently popular e.g., "play popular hits" |
| querychart | detect a request for information about a chart e.g., "who was number one on the 12th of August 1990" |
| setpreset | detect a requeset to store the current playlist to a preset on the playback device e.g. "set preset nine" |
| stickwith | detect a request to keep the playlist similar to the currently playing item e.g., "stick with this" |
| stickwithspecific | detect a request to change the playlist to only use a particular entity e.g., "stick with David Bowie" |
| thanks | detect acknowledgement from the user e.g., "cheers" |
| whoplayedinfo | detect request for information about performers on the track e.g., "who played drums on this" |

Clauses

As will be appreciated, the invention may be as described as outlined in the following clauses:

1. A content playback system comprising:
   a playback device, the playback device being configured to detect a voice command from a user and to play content;
   wherein the system is configured to:
   analyse a voice command detected by the playback device to determine a user intent;
   analyse the voice command to extract one or more entities from the voice command, wherein each of the extracted entities is of a type associated with the determined user intent; and
   based on the one or more extracted entities, control the playback device.

2. A content playback system according to clause 1, wherein the system is further configured to store a plurality of predefined user intents, and wherein the user intent is determined from the plurality of predefined user intents.

3. A content playback system according to clause 2, wherein the system is further configured to:
   store, for each of the plurality of predefined user intents, a pattern associated with that predefined user intent; and
   determine that a predefined user intent is the user intent if a phrase in the voice command matches the pattern associated with that predefined user intent.

4. A content playback system according to clause 2 or clause 3, wherein the plurality of predefined user intents is stored as an ordered list, and wherein the system is configured to iteratively determine whether a predefined user intent is the user intent in the order in which the plurality of predefined user intents is stored.

5. A content playback system according to any one of clauses 2 to 4, wherein the system is further configured to store, for each of the plurality of predefined user intents, one or more entity types associated with that predefined user intent.

6. A content playback system according to clause 5, wherein the system is further configured to:
   for a first entity type stored by the system, store a plurality of regular expressions associated with the first entity type; and
   extract an entity of the first entity type from the voice command by matching a phrase in the voice command with one of the plurality of regular expression associated with the first entity type.

7. A content playback system according to clause 5 or 6, wherein the system is further configured to:
   for a second entity type stored by the system, store a phrase structure associated with the second entity type; and
   extract an entity of the second type from the voice command by matching a phrase in the voice command with the phrase structure associated with the second entity type.

8. A content playback system according to clause 7, wherein the phrase structure has a song field and an artist field.

9. A content playback system according to clause 8, wherein the system is further configured to:
   determine an artist name from the phrase in the voice command, the artist name being a string in the phrase that is at a position corresponding to the artist field in the phrase structure;
   obtain from a database a list of song names associated with the artist name; and
   extract the entity of the second type by matching a song name in the list of song names with a string in the phrase that is at a position corresponding to the song field.

10. A content playback system according to any preceding clause, wherein controlling the playback device based on the one or more extracted entities includes selecting an entity from the one or more extracted entities based on a set of conflict resolution rules, and controlling the playback device based on the selected entity.

11. A content playback system according to clause 10, wherein the set of conflict resolution rules are set such that, when the one or more extracted entities includes two or more overlapping entities, the longest entity of the overlapping entities is selected.

12. A content playback system according to clause 10 or 11, wherein the set of conflict resolution rules are set such that, when the one or more extracted entities includes two or more overlapping entities, one of the overlapping entities having a prioritized entity type is selected.

13. A content playback system according to any one of clauses 10 to 12, wherein selecting an entity includes identifying word boundaries in the voice command, and discarding entities which do not start and end at identified word boundaries.

14. A content playback system according to any preceding clause wherein controlling the playback device includes playing content via the playback device.

15. A content playback system according to any preceding clause, wherein controlling the playback device includes generating or adapting a content playlist, and playing the content playlist via the playback device.

16. A content playback system according to any preceding clause, further comprising a content server configured to store content that is playable by the playback device.

17. A content playback system according to any preceding clause, further comprising a controller separate from the playback device, the controller being configured to control the playback device.

18. A content playback system according to any preceding clause, wherein the playback device comprises a speaker for playing audio content.

19. A method of controlling a playback device, the playback device being configured to detect a voice command from a user and to play content, the method comprising:
analysing a voice command detected by the playback device to determine a user intent;
analysing the voice command to extract one or more entities from the voice command, wherein each of the extracted entities is of a type associated with the determined user intent; and
controlling the playback device based on the one or more extracted entities.

20. A method according to clause 19, further comprising storing a plurality of predefined user intents, wherein the user intent is determined from the plurality of predefined user intents.

21. A method according to clause 20, further comprising:
storing, for each of the plurality of predefined user intents, a pattern associated with that predefined user intent; and
determining that a predefined user intent is the user intent if a phrase in the voice command matches the pattern associated with that predefined user intent.

22. A method according to clause 21, wherein the plurality of predefined user intents is stored as an ordered list, the method further comprising:
iteratively determining whether a predefined user intent is the user intent in the order in which the plurality of predefined user intents is stored.

23. A method according to any one of clauses 20-22, further comprising storing, for each of the plurality of user intents, an entity type associated with that predefined user intent.

24. A method according to clause 23, further comprising:
storing, for a stored first entity type, a plurality of regular expressions associated with the first entity type; and
extracting an entity of the first entity type from the voice command by matching a phrase in the voice command with one of the regular expressions associated with the first entity type.

25. A method according to clause 22 or 23, further comprising:
storing, for a stored second entity type, a phrase structure associated with the second entity type; and
extracting an entity of the second entity type from the voice command by matching a phrase in the voice command with the phrase structure associated with the second entity type.

26. A method according to clause 25, wherein the phrase structure has a song field and an artist field, the method further comprising:
determining an artist name from the phrase in the voice command, the artist name being a string in the phrase that is at a position corresponding to the artist field in the phrase structure;
obtaining from a database a list of song names associated with the artist name; and
extracting the entity of the second type by matching a song name in the list of song names with a string in the phrase that is at a position corresponding to the song field.

27. A method according to any one of clauses 19-26, wherein controlling the playback device based on the one or more extracted entities includes selecting an entity from the one or more extracted entities based on a set of conflict resolution rules, and controlling the playback device based on the selected entity.

The subject matter described above, including the aforementioned clauses, is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. A content playback system comprising:
a playback device, the playback device being configured to detect a voice command from a user and to play content;
wherein the system is configured to:
analyse a voice command detected by the playback device to determine a user intent;
analyse the voice command to extract one or more entities from the voice command, wherein each of the extracted entities is of a type associated with the determined user intent;
select an entity from the one or more extracted entities based on a set of conflict resolution rules, wherein the set of conflict resolution rules are set such that, when the one or more extracted entities includes two or more overlapping entities, the longest entity of the overlapping entities is selected; and
control the playback device based on the selected entity.

2. A content playback system according to claim 1, wherein the system is further configured to store a plurality of predefined user intents, and wherein the user intent is determined from the plurality of predefined user intents.

3. A content playback system according to claim 2, wherein the system is further configured to:
store, for each of the plurality of predefined user intents, a pattern associated with that predefined user intent; and determine that a predefined user intent is the user intent if a phrase in the voice command matches the pattern associated with that predefined user intent.

4. A content playback system according to claim 2, wherein the plurality of predefined user intents is stored as an ordered list, and wherein the system is configured to iteratively determine whether a predefined user intent is the user intent in the order in which the plurality of predefined user intents is stored.

5. A content playback system according to claim 2, wherein the system is further configured to store, for each of the plurality of predefined user intents, one or more entity types associated with that predefined user intent.

6. A content playback system according to claim 5, wherein the system is further configured to:
for a first entity type stored by the system, store a plurality of regular expressions associated with the first entity type; and
extract an entity of the first entity type from the voice command by matching a phrase in the voice command with one of the plurality of regular expression associated with the first entity type.

7. A content playback system according to claim 5, wherein the system is further configured to:
for a second entity type stored by the system, store a phrase structure associated with the second entity type; and
extract an entity of the second type from the voice command by matching a phrase in the voice command with the phrase structure associated with the second entity type.

8. A content playback system according to claim 7, wherein the phrase structure has a song field and an artist field.

9. A content playback system according to claim 8, wherein the system is further configured to:
determine an artist name from the phrase in the voice command, the artist name being a string in the phrase that is at a position corresponding to the artist field in the phrase structure;
obtain from a database a list of song names associated with the artist name; and
extract the entity of the second type by matching a song name in the list of song names with a string in the phrase that is at a position corresponding to the song field.

10. A content playback system according to claim 1, wherein the set of conflict resolution rules are set such that, when the one or more extracted entities includes two or more overlapping entities, one of the overlapping entities having a prioritized entity type is selected.

11. A content playback system according to claim 1, wherein selecting an entity includes identifying word boundaries in the voice command, and discarding entities which do not start and end at identified word boundaries.

12. A content playback system according to claim 1, wherein controlling the playback device includes playing content via the playback device.

13. A content playback system according to claim 1, wherein controlling the playback device includes generating or adapting a content playlist, and playing the content playlist via the playback device.

14. A content playback system according to claim 1, further comprising a content server configured to store content that is playable by the playback device.

15. A content playback system according to claim 1, further comprising a controller separate from the playback device, the controller being configured to control the playback device.

16. A content playback system according to claim 1, wherein the playback device comprises a speaker for playing audio content.

17. A method of controlling a playback device, the playback device being configured to detect a voice command from a user and to play content, the method comprising:
analysing a voice command detected by the playback device to determine a user intent;
analysing the voice command to extract one or more entities from the voice command, wherein each of the extracted entities is of a type associated with the determined user intent;
selecting an entity from the one or more extracted entities based on a set of conflict resolution rules, wherein the set of conflict resolution rules are set such that, when the one or more extracted entities includes two or more overlapping entities, the longest entity of the overlapping entities is selected; and
controlling the playback device based on the selected entity.

18. A method according to claim 17, further comprising storing a plurality of predefined user intents, wherein the user intent is determined from the plurality of predefined user intents.

19. A method according to claim 18, further comprising:
storing, for each of the plurality of predefined user intents, a pattern associated with that predefined user intent; and
determining that a predefined user intent is the user intent if a phrase in the voice command matches the pattern associated with that predefined user intent.

* * * * *